United States Patent

Osborne et al.

[11] Patent Number: 6,048,244
[45] Date of Patent: Apr. 11, 2000

[54] METHOD FOR PROVIDING A RESISTIVE LENS STRUCTURE FOR AN ELECTRON BEAM DEVICE

[75] Inventors: William N. Osborne, Ringwood, N.J.; Petrus J. M. Prinsen, Eindhoven, Netherlands; Edwin A. Montie, Eindhoven, Netherlands; Edward C. Cosman, Eindhoven, Netherlands

[73] Assignee: Philips Electronics N. A. Corporation, New York, N.Y.

[21] Appl. No.: 09/017,095

[22] Filed: Feb. 2, 1998

Related U.S. Application Data

[60] Division of application No. 08/398,314, Mar. 3, 1995, abandoned, which is a continuation-in-part of application No. 08/277,446, Jul. 19, 1994, Pat. No. 5,510,670.

[51] Int. Cl.⁷ ........................................... B05D 5/12
[52] U.S. Cl. .................. 445/36; 29/620; 427/101; 427/126.2; 427/126.5
[58] Field of Search ................... 313/450, 479, 313/445, 452, 432, 439; 315/3; 29/620, 611; 338/258; 427/101, 126.2, 126.5; 445/36

[56] References Cited

U.S. PATENT DOCUMENTS

| | | | |
|---|---|---|---|
| 4,076,894 | 2/1978 | Langley et al. | 428/428 |
| 4,713,879 | 12/1987 | Vrijssen et al. | 313/450 |
| 4,827,184 | 5/1989 | Spanjer et al. | 313/450 |
| 4,853,589 | 8/1989 | Vrijssen et al. | 313/450 |
| 4,857,797 | 8/1989 | Vrijssen et al. | 313/450 |
| 5,510,670 | 4/1996 | Osborne et al. | 313/450 |

FOREIGN PATENT DOCUMENTS 1069059  5/1967  United Kingdom ............ C08F 45/04

Primary Examiner—Michael H. Day
Attorney, Agent, or Firm—Norman N. Spain

[57] ABSTRACT

A method for providing a resistive focusing lens structure for an electron beam device including forming a suspension of particles of a mixture of, by weight, of about 33–50% of an oxidic conductive material including about 40–60% of a lead ruthenate, about 25–38% of a lead titanate and about 2–15% of a ruthenium oxide, and of about 50–67% of a glass including about 30–40% of silicon dioxide ($SiO_2$), about 3–7.5% alumina ($Al_2O_3$), and about 53–67% of lead oxide (PbO) in a suspending medium consisting essentially of a non-acidic liquid having a boiling point of less than 150° C., applying the suspension to an inside surface of a glass member to thereby provide a coating of the particles on the inside surface, firing the coating at a temperature of 700–900° C. and before of after firing the coating, patterning the coating. The present method provides highly reproducible resistive focusing lens structures.

5 Claims, 3 Drawing Sheets

METHOD FOR PROVIDING A RESISTIVE LENS STRUCTURE FOR AN ELECTRON BEAM DEVICE

CROSS REFERENCE TO RELATED APPLICATIONS

This is a divisional of application Ser. No. 08/398,314 filed Mar. 3, 1995 and now abandoned and which was a continuation-in-part of application Ser. No. 08/277,446, filed Jul. 19, 1994 and now U.S. Pat. No. 5,510,670.

BACKGROUND OF THE INVENTION

The invention relates to an electron beam device such as a cathode ray tube (CRT) comprising an evacuated envelope including an electron gun comprising electron-beam means for producing in operation at least one electron beam directed to a surface and a resistive focusing lens structure for producing a focusing lens field for focusing said at least one electron beam to a spot on said surface, said focusing lens structure comprises a resistive material and has supply means to supply a voltage to said focusing lens structure.

The invention also relates to a method of providing a resistive focusing lens structure for an electron beam device comprising electron-beam means for producing at least one electron beam directed to a surface, said focusing lens structure being provided on an inside surface of a glass member to be positioned around the path of said at least one electron beam.

A conventional electron beam device comprises an electron gun which, generally, comprises a number of sheet metal parts (grids) held together by glass rods. The grids are at different voltages to produce lenses for focusing the electron beams. A major shortcoming of a conventional gun is the spherical aberration of the main lens, causing rays passing through the outer zones of the lens to be refracted more than the paraxial rays. This leads to increased spot sizes on the surface on which the electron beam is focused; said surface in a CRT is usually called a screen. The focusing efficiency can be improved by increasing the number of metal grids, but this is preferably done without increasing the number of high-voltage leads though the envelope. A solution to this problem was found by interconnecting extra grids by a resistive voltage divider which supplies the high voltages for the extra grids. A better solution, however, is to integrate the grids and the voltage divider in a single part by using a resistive focusing lens structure. A resistive focusing lens structure comprises an elongated tubular resistive element patterned to create an electron lens when a voltage difference or voltage differences are applied over the resistive element. In some known electron beam devices a resistive focusing lens structure is formed by an elongated tubular member which is coated on the inside with a high-ohmic resistive layer patterned to create an efficient electron lens. The electric field created when a current is passed through the high-ohmic resistive layer acts as an efficient focusing lens. In addition, resistive focusing lens structures enable the realization of lenses with low spherical aberration.

Electron beam devices of the type mentioned above are known in the art and are described in, for example, Vrijssen, U.S. Pat. No. 4,713,879, Spanjer et al., U.S. Pat. No. 4,827,184, Vrijssen et al., U.S. Pat. No. 4,857,797, and Vrijssen et al., European Patent Application EP-A 513,909.

Although the known electron beam devices offer in respect of conventional electron beam devices a much improved focusing ability, they have as yet not been made in mass production. The inventors have realized that a major problem is caused hereby that, in order to make full and efficient use of the improved focusing ability, the electric focusing field generated by the resistive focusing lens structure has to comply with high standards of reproducibility. The electric fields generated by the resistive focusing lens structure should be reproducible in time and between different focusing lens structures.

SUMMARY OF THE INVENTION

It is, inter alia, an object of the present invention to improve the focusing quality of an electron beam device to the type described above by improving the reproducibility of the electric focusing fields generated by the focusing lens structure.

According to a first aspect of the invention the electron beam device as mentioned in the first paragraph is characterized in that the total resistance of the resistive focusing lens structure is larger than 2.5 G$\Omega$ and the absolute value of the temperature coefficient of resistance (TCR) of the resistive focusing lens structure is smaller than $250 \cdot 10^{-6}$ $K^{-1}$.

In general, the focusing current, i.e. the current through the resistive element, should not exceed 10 $\mu$A. The voltage difference over the resistive element being typically of the order of 25 kV, this implies that the total resistance of the focusing lens structure should be larger than 2.5 G$\Omega$.

When an electron beam device is turned on the temperature of the focusing lens structure increases, the maximum temperature rise being approximately 100° C. This temperature rise is, for example, due to the power dissipation in the lens itself, in the cathode filaments and in the deflection coils. In addition, a gradient in temperature over the length of the resistive focusing lens structure may occur. Such a temperature gradient may be caused by a nonuniform heating of the focusing lens structure. It is essential that the resistive coating shows no significant change in resistance during warm-up, especially in a colour gun.

When the temperature of the resistive focusing lens structure changes during operation, the resistance and therefore the focusing current changes. Generally, the fluctuation of the focusing voltage ($\delta V_{foc}$) should be lower than 50 V. With an internal resistance of the focus power supply of about 200 M$\Omega$ this implies that the change in focusing current ($\delta I_{foc}$) should be smaller than 250 nA. Thus:

$$\delta I_{foc} \cdot \frac{(V_a - V_{foc}) \cdot \alpha \cdot \Delta T}{R_{tot}} < 240 \text{ nA}$$

where $V_a$ is the anode voltage, $V_{foc}$ is the focusing voltage, $R_{tot}$ is the total resistance of the resistive focusing lens structure and $\alpha$ is the absolute value of the temperature coefficient of resistance (TCR) defined as:

$$\alpha = |TCR| \cdot \frac{1}{R}\left|\frac{\delta R}{\delta T}\right|.$$

The greater the TCR the greater becomes the change in the resistance of the lens structure. The electric current through the focusing lens structure changes giving rise to a change in focusing voltage due to the internal resistance of the focusing voltage power supply, which is typically of the order of 200 M$\Omega$.

The maximum temperature rise $\Delta T$ in the resistive focusing lens structure from cold to normal working temperature is about 100° C. In a device in accordance with the first aspect of the invention, the absolute value of the TCR for a focusing lens structure with a total resistance of larger than 2.5 GΩ should be smaller than 250 ppm ($|TCR| \leq 250 \cdot 10^{-6}$ $K^{-1}$). Due to this extremely low value of the temperature coefficient of resistance, the electron gun does not run out of focus due to heating during normal operation whereby the reproducibility of the electric focusing field is increased so that the spotsize remains practically constant.

According to a second aspect of the invention a new and improved electron beam device as mentioned in the first paragraph is provided in which the focusing lens structure comprises an elongated tubular member positioned around the path of said at least one electron beam, said tubular member being provided on an inner surface thereof with said at least one resistive focusing lens structure, said at least one resistive focusing lens structure comprising a resistive material, said resistive material comprising, by weight, about 10%–50% of conductive material comprising about 40%–100% of a lead ruthenate, about 0%–40% of a lead titanate and about 0%–20% of a ruthenium oxide in about 50%–90% of a glass comprising about 15%–40% of $SiO_2$, about 0.5%–10% of $Al_2O_3$ and about 53%–75% of PbO.

In earlier resistive coatings ruthenium oxide was used as the conductive material in combination with a low-melting glass enamel (containing PbO). However, the temperature coefficient of resistance of the coating appeared to be more than an order of magnitude too high and the fabrication process exhibited a poor reproducibility, probably due to the low conductor content (<1% by weight). By using a conducting material based on lead ruthenate instead of ruthenium oxide, the desired values of the total resistance as well as of TCR are obtained, giving the focusing lens structure the required stability and thus reproducibility with respect to changes in temperature and gradients of the temperature during operation.

In order to obtain the desired reproducibility during fabrication a further restriction of the ranges is desirable for selecting the components of the conductive material and the glass constituting the resistive material. To ensure that a resistive focusing lens structure generates a reproducible electric field, the homogeneity of resistance in the coating must be excellent. In particular, in colour displays using CRT's having three lenses, these lenses are connected to a single voltage supply, the homogeneity will should be good enough to ensure that the lenses have the same focusing voltage, thus implying that a highly reproducible resistive coating is required. To this end a preferred embodiment of an electron beam device as mentioned in the first paragraph is provided in which the resistive material of the focusing lens structure comprises, by weight, about 33%–50% of a conductive material comprising about 40%–60% of a lead ruthenate, about 25%–38% of a lead titanate and about 2%–15% of a ruthenium oxide in about 50%–67% of a glass comprising about 30%–40% of $SiO_2$, about 3%–7.5% of $Al_2O_3$ and about 53%–67% of PbO. This particular composition range for the components constituting the resistive material provides the desired homogeneity of the resistance distribution over the focusing lens structure.

According to a third aspect of the invention a new method of providing a resistive focusing lens structure for an electron beam device as mentioned in the second paragraph comprises forming a suspension of particles of a mixture of by weight, of about 33%–50% of an oxidic conductive material comprising oxide about 40%–60% of a lead ruthenate, about 25%–38% of a lead titanate and about 2%–15% of a ruthenium oxide and of about 50%–67% of a glass comprising about 30%–40% of $SiO_2$, about 3%–7.5% of $Al_2O_3$ and about 53%–67% of PbO in a suspending medium consisting essentially of a non-acidic organic liquid having a boiling point of less than 150° C., applying said suspension to said inside surface to thereby provide a coating of said particles on said inside surface, firing said coating at a temperature of 700° C.–900° C. and, before or after firing said coating, patterning said coating. For these compositions and this manufacturing process the reproducibility of the absolute values of the resistivity has proven to be very high as will be shown below.

BRIEF DESCRIPTION OF THE DRAWINGS

In the drawings.

The drawings are purely diagrammatical and are not drawn to scale, with corresponding parts generally bearing the same reference numerals.

DETAILED DESCRIPTION OF THE INVENTION

Figure 1:
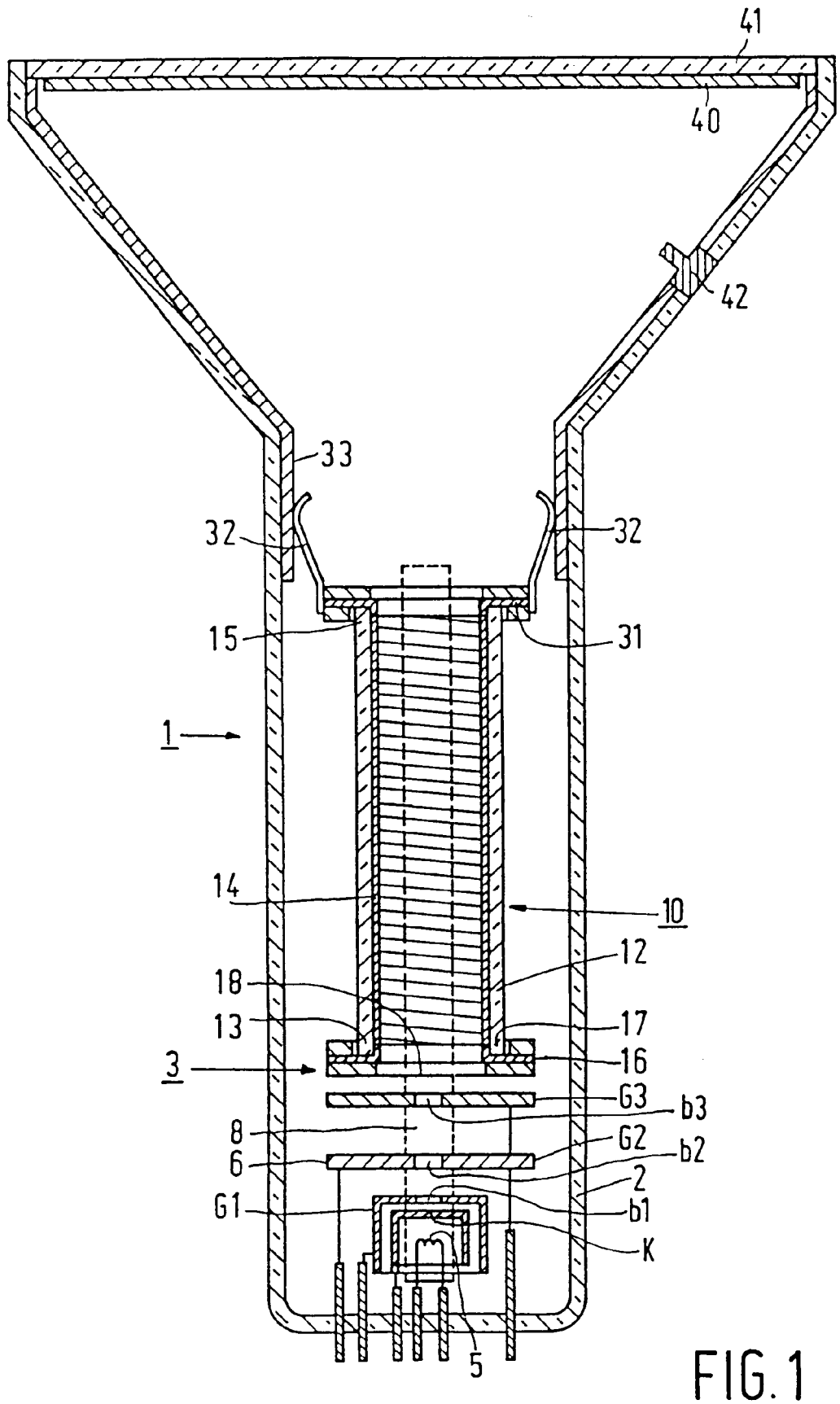
FIG. 1 shows an example of a diagrammatic cross-sectional view of an electron beam device of the invention.

The invention will now be described in greater detail with reference to the figures of the drawing.

In FIG. 1 an electron beam device, in this example a cathode ray tube (CRT), comprising a luminescing screen, for example a phosphor screen 40 deposited on a display window 41 and an electron gun 3 mounted in a neck portion 2, is shown, A G1 (grid) electrode structure is provided with a typical aperture b1 behind which a cathode K having an electron-emitting surface is deposited, with a heater 5 bordering thereon. A G2 electrode structure, in this constituted by a metal sheet 6 having a central aperture b2, is located more to the front, bordering on the G1 electrode structure. A G3 electrode structure with a central aperture b3, constituted by a metal sheet is located even more to the front. To form an assembly, the electrode structures G1, G2 and G3, which constitute the beam producing portion—in this case the triode portion—of the gun, are attached to insulating mounting rods via pins (or brackets), one of them (8) being shown in FIG. 1. In this case two rods are used. However, the invention is not limited thereto. For example, four or three mounting rods may be used in an alternative and in itself customary manner. A resistive focusing lens structure 10 includes a tubular member 12 of an electrically insulating material, for example glass, ceramic, (sintered) alumina or quartz, which tubular member 12 is coated on its inner surface with a layer 14 of a material which according to the invention has a high electrical resistance as well as an extremely low absolute value of the temperature coefficient of resistance (TCR). The resistive focusing lens structure 10 is positioned around the path of the electron beam. The tubular member 12 is rigidly connected to a fold edge 17 of a metal sheet 16 at its end 13, which fold edge 17 surrounds an aperture 18 in the sheet 16 via which sheet 16 it is attached to the mounting rods to which also the beam-forming portion of the gun is secured. The tubular member 12 is secured to the mounting rods at its end 15 in a similar manner, by means of a metal sheet 31. To obtain an accurate focusing, a voltage difference is applied across the ends of the layer by connecting the metal sheets 16 and 31 to external voltage sources (not shown in FIG. 1). In this case the metal sheets 16 and 31 function as the supply means. The resistive layer 14 may have the shape of one or more rings, or it may have, for example a helical shape or a meandering structure or a combination of one or more rings with a helix or with a meandering structure. The electron gun 3 is positioned in the neck portion 2 by means of a centering unit having in this embodiment flexible electrically conducting elements 32. The flexible elements 32 also contact an electrical conducting layer 33 deposited on the inner surface of the envelope of the cathode ray tube. In the envelope, the anode contact 42 is present for applying a desired potential to the conducting layer. A getter arrangement can be provided on the anode contact (not shown in FIG. 1).

In the example of FIG. 1 the resistive focusing lens structure 10 comprises a separate tubular member 12. However, the tubular member 12 can be constituted in embodiments here not shown by the neck 2 itself so that the high-ohmic resistive material layer 14 is provided on the inside surface of said neck 2. Examples of both embodiments are shown in European Patent Application EP-A 275,611.

In a colour display, there is, generally, only one adjustable focusing voltage power supply. All three electron guns (red, green and blue) are supplied with the same focusing voltage. It is thus important that the three lenses are identical, i.e. require the same focusing voltage. This means that the resistive segments of the lenses have to posses the same resistive distribution. If the resistive distribution of the different lenses in a glass gun is unequal this results in a spread of the focusing voltage and the three lenses can not be in focus at the same voltage.

Figure 2:
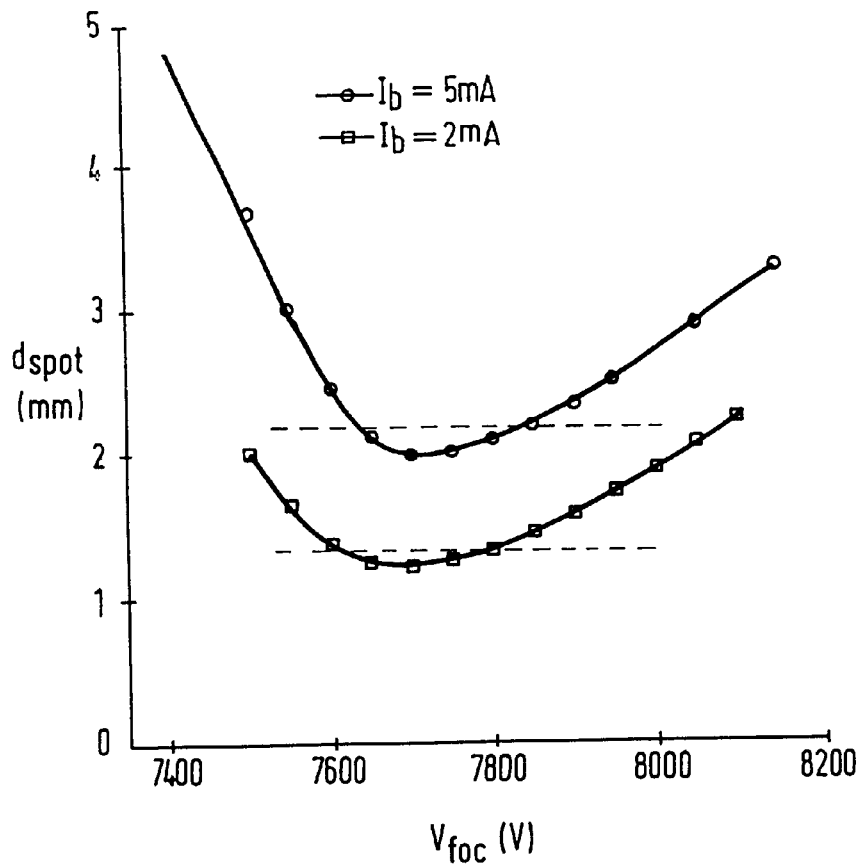
FIG. 2 is an illustrative example of the spot size as function of the focusing voltage for a unipotential lens.
Figure 3A:
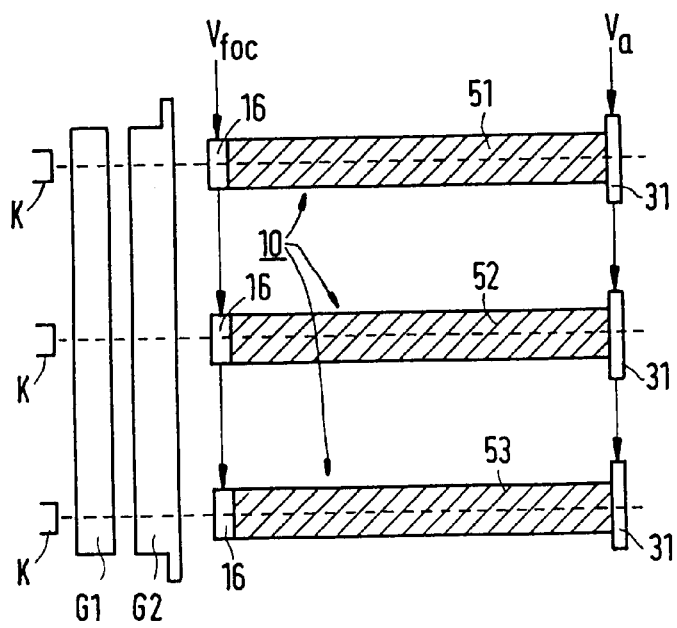
FIG. 3A shows diagrammatically several important parts of the electron gun shown in FIG. 1, the resistive focusing lens structure being of the bipotential type.

FIG. 2 shows an example of the spotsize $d_{spot}$ (in mm) as a function of the focusing voltage $V_{foc}$ (in V) for a unipotential lens for two values of the average electron beam current, i.e. $I_b=2$ mA and $I_b=5$ mA. The horizontal dashed lines represent a 10% greater spotsize with respect to the minimum spotsize. Unequal lenses in one colour gun thus give rise to different spotsizes and therefore loss of resolution. Generally, a total spread in focusing voltage of no more than 100 V is acceptable (i.e. a fluctuation in focusing voltage of less than ±50 V).

Wherein FIG. 1 shows an embodiment of an electron gun 3 in a CRT in which during operation only one electron beam is generated and directed to the display window 41 via one resistive focusing lens structure 10, in the embodiment of the electron gun 3 as diagrammatically shown in FIG. 3A three electron beams are generated and directed to a display window (not shown) via three resistive focusing lens structures 10. Each resistive focusing lens structure 10 in FIG. 3A comprises a lens system of the bipotential type. Each resistive focusing lens structure 10 comprises a resistive layer 51, 52, 53 which according to the invention has a high electrical resistance as well as an extremely low absolute value of TCR. Metal sheets 16 and 31 function as the supply means.

For lens systems of the bipotential type, the anode voltage $V_a$ is supplied to the resistive layers 51, 52, 53 via the metal sheets 31 whereas the focusing voltage $V_{foc}$ is supplied to the resistive layers 51, 52, 53 via the metal sheets 16.

Figure 3B:
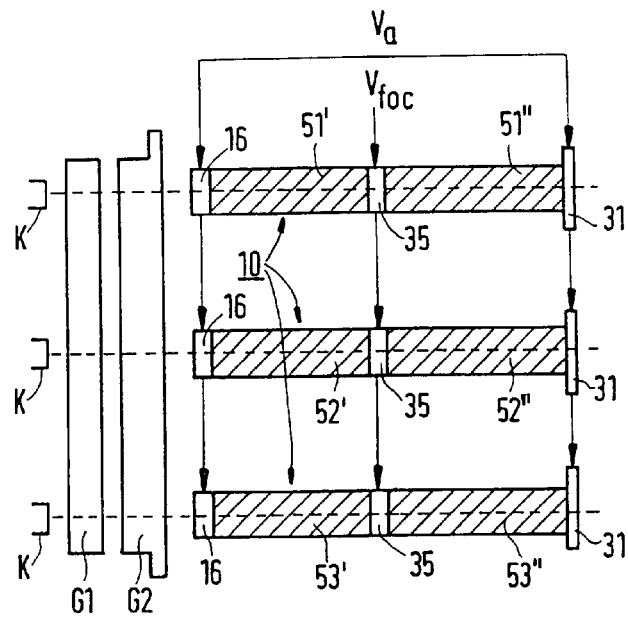
FIG. 3B shows diagrammatically several important parts of the electron gun shown in FIG. 1, the resistive focusing lens structure being of the unipotential type.

In the embodiment of the electron gun 3 as diagrammatically shown in FIG. 3B, each resistive focusing lens structures 10 comprises a lens system of the unipotential type. Each resistive focusing lens structure 10 comprises two resistive layers 51' and 51", 52' and 52", and 53' and 53", respectfully. Metal sheets 16, 31 and 35 function as the supply means. For lens systems of the unipotential type, the anode voltage $V_a$ is supplied to the resistive layer 51', 51", 52', 52", 53', 53" via the metal sheets 16 and 31 whereas the focusing voltage $V_{foc}$ is supplied to the resistive layers 51', 51", 52', 52", 53', 53" via the supply means 35.

Figures 4A, 4B:
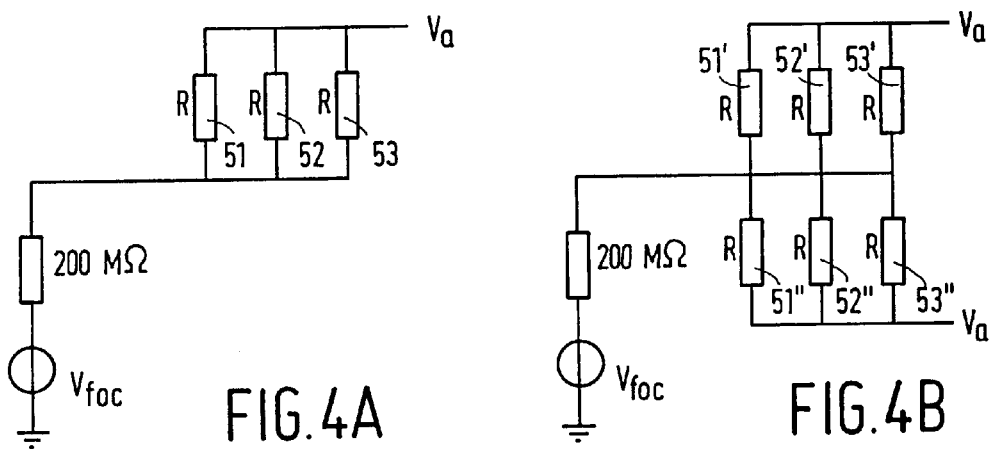
FIG. 4A shows an example of practical circuit connection of a bipotential resistive focusing lens structure with focus and anode power supplies.
FIG. 4B shows an example of practical circuit connection of a unipotential resistive focusing lens structure with focus and anode power supplies.

FIG. 4A shows an example of practical circuit connection of a bipotential resistive focusing lens structure with focus ($V_{foc}$) and anode ($V_a$) power supplies.

FIG. 4B shows an example of practical circuit connection of a unipotential resistive focusing lens structure with focus ($V_{foc}$) and anode ($V_a$) power supplies.

In a preferred embodiment of the invention the electron beam device as mentioned in the first paragraph is characterized in that said electron gun generates in operation three electron beams, said resistive focusing lens structure is of the unipotential or bipotential type and comprises three separate substructures surrounding the respective paths of said electron beams, said substructures being electrically connected in parallel, each substructure having a resistance measured between said supply means of larger than 7.5 GΩ.

For a single bipotential lens, which constitutes half of the unipotential lens (see FIG. 4A), the total resistance R should be at least 7.5 GΩ. For a single unipotential lens mounted in a colour gun this implies a total resistance of approximately 30 GΩ (in FIG. 4B each R=15 GΩ).

Various electron beam devices such as cathode ray tubes and x-ray tubes may employ the instant invention. However, the instant invention is particularly useful in cathode ray tubes. That is because, among other reasons, due to the large number of cathode ray tubes produced to a single specification at a particular factory it is important from an economic point of view that the number of cathode ray tubes not meeting the specification and thus being unsuitable for marketing be reduced to an absolute minimum. Thus the reproducibility of the focusing lenses, essential components of cathode ray tubes, should be as high as possible.

A preferred embodiment of an electron beam device is characterized in that the electron beam device comprises a glass envelope consisting of a display window, a cone, a neck and the electron-beam means are situated inside said envelope opposite said window.

In earlier resistive coatings ruthenium oxide was used as the conductive material in combination with a low-melting glass enamel. However, the temperature coefficient of resistance of the coating appeared to be more than an order of magnitude too high and the fabrication process exhibited a poor reproducibility. According to the second aspect of the invention the resistive material of the resistive focusing lens structure comprises, by weight, about 10%–50% of conductive material comprising about 40%–100% of a lead ruthenate, about 0%–40% of a lead titanate and about 0%–20% of a ruthenium oxide in about 50%–90% of a glass comprising about 15%–40% of $SiO_2$, about 0.5%–10% of $Al_2O_3$ and about 53%–75% of PbO. By using a conductive material based on lead ruthenate, the desired values of the total resistance as well as of TCR are obtained, giving the focusing lens structure the required stability and thus reproducibility with respect to changes in temperature and gradients of the temperature during operation.

The thickness of the coating provided on the inner surface of the neck of the cathode ray tube is preferably 3 $\mu$m. Preferably in the coating the glass and the conductive material are present in a weight ratio of about 1.3–1.7:1.

To obtain the desired homogeneity of the resistance distribution over the focusing lens structure and the desired reproducibility during fabrication the resistive material of the focusing lens structure comprises according to a preferred embodiment of the invention, by weight, about 33%–50% of conductive material comprising about 40%–60% of a lead ruthenate, about 25%–38% of a lead titanate and about 2%–15% of a ruthenium oxide in about 50%–67% of a glass comprising about 30%–40% of $SiO_2$, about 3%–7.5% of $Al_2O_3$ and about 53%–67% of PbO. While all lead ruthenates, lead titanates and ruthenium oxides are useful it has been found that particularly good results are achieved when the lead ruthenate is $Pb_2Ru_2O_{6.5}$, the lead titanate is $PbTiO_3$ and the ruthenium oxide is $RuO_2$. In particular, the glass present in the suspension consists essentially of 57%–61% of PbO, 34%–37% of $SiO_2$ and 3%–5% of $Al_2O_3$ and the conductive material present in the suspension consists essentially of 48%–51% of $Pb_2Ru_2O_{6.5}$, 34%–37% of $PbTiO_3$ and 14%–15% of $RuO_2$, all by weight.

The coating is preferably applied from a suspension of the constituents of the glass material and the conductive material in a liquid organic non-acidic suspending medium having a boiling point of less that 150° C. As the suspending agent a monohydroxy aliphatic alcohol of 1–5 carbons may be used. Of these, isopropanol is particularly useful. While the pH of the suspension may be in the range of 8–10, it preferably is about 8 since at this pH the optimum degree of dispersion of the solids in the liquid suspending agent is achieved. Preferably, the pH is achieved by the addition of ammonium hydroxide. However, other liquid alkaline materials such as low molecular weight aliphatic amines, for example, dimethylamine, ethylamine and n-propyl amine may also be used.

The total weight percentage of the solids in the suspension is preferably about 40% and the particle size range of the solids is preferably about 1–3 $\mu$m, since at this concentration of solids and particle size range optimum coverage of the glass surface by the solids in the suspension is achieved.

The suspension may be applied to the inner surface of the tubular member by methods well known in the art, for example by flow coating or by suction of the suspension vertically into the tubular member.

After heating at a temperature of 30° C. to 35° C. to remove the liquid suspending agent, the resultant coating of solids is fired at a temperature of 700° C.–900° C. and preferably of 800° C.–900° C. in an oxygen containing atmosphere to cause the solids to form a uniform layer tightly bonded to the glass surface.

Figure 5:
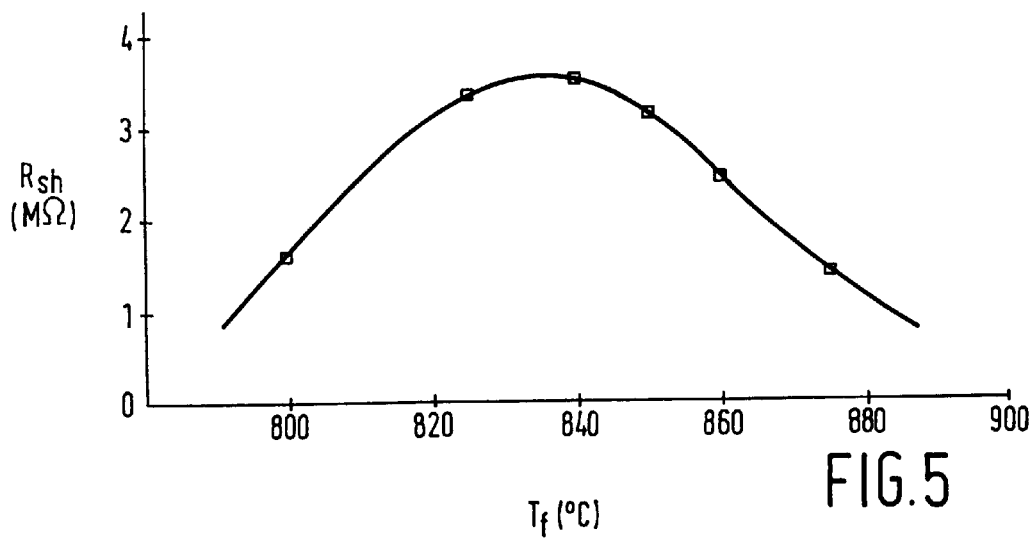
FIG. 5 shows an example of the sheet resistance as a function of the firing temperature.

FIG. 5 shows an example of the sheet resistance ($R_{sh}$ in M$\Omega$) as a function of the firing temperature ($T_f$ in °C.). The shallow slope of the curve appears to be characteristic of systems based on focusing lens structures comprising a resistive material with compositions comprising, by weight, about 33%–50% of a conductive material comprising about 40%–60% of a lead ruthenate, about 25%–38% of a lead titanate and about 2%–15% of a ruthenium oxide in about 50%–67% of a glass comprising about 30%–40% of $SiO_2$, about 3%–7.5% of $Al_2O_3$ and about 53%–67% of PbO. The shallow slope, which in this particular case reaches a maximum at a firing temperature of 835° C., enables a stable, reproducible value of the resistance to be obtained since furnaces in this temperature range can easily be controlled within 1° C.

If parts of the resistive layer on the inner surface of the tubular member require a helical or meandering shape, the coating can be given the desired helical or meandering configuration by mechanical means such as by a stylus before firing or by means of a laser after firing.

Preferably the tubular member is made of glass and the softening point of this glass envelope should not be lower than the highest firing temperature employed, thus preferably not lower than 850° C.

For a more complete understanding of the invention the invention will now be described in greater detail with reference to the figure of the drawing and the following example.

EXAMPLE 50 g of a glass frit of the composition 60% PbO, 35% $SiO_2$ and 5% $Al_2O_3$ were dispersed in about 150 grams of isopropanol. The resultant suspension was milled in a ball mill for about 8 hours until the largest particle size present in this suspension of glass-like material was not greater than 3 $\mu$m.

36 g of a conductive material consisting of about 50% of $Pb_2Ru_2O_{6.5}$, 35% $PbTiO_3$ and 15% $RuO_2$ was added to the suspension of the glass particles. The resultant mixture was then milled in a mill for a period of about 16 hours until the largest particle size was not greater than about 2 $\mu$m. This suspension was then sieved over a 11 $\mu$m sieve.

A coating composition was then prepared from the sieved solution by forming a suspension containing about 40 grams of solids in about 80 ml of isopropanol to which sufficient $NH_4OH$ was added to provide a pH of about 8.

Referring to FIG. 1 a small amount of the coating composition was sucked up inside the tubular member 12 preferably formed of a glass having a softening point of about 925° C. As a result a layer 14 of powder was provided on the inside of the tubular member 12. The layer was then dried with a stream of nitrogen.

Those parts of the resistive layer 14 which require a helical or meandering shape, can be formed by applying a steel stylus to the coating while turning the tubular member 12. When the powder is scraped off the tube, the loose grains tend to hamper the engraving or cause shorts by filling up the fresh grooves again. However, a gentle air flow through the tube solves this problem. The tubular member 12 was then fired at a temperature of about 840° C. for about 15 minutes. Similarly, a laser can be employed to give the coating the desired helical or meandering structure after firing.

The resistive focusing lens structure 10 is positioned around the path of the electron beam by securing the tubular member 12 rigidly in the beam-forming portion of the electron gun 3. As mentioned before, the tubular member 12 can also be constituted by the neck 2 itself in such a manner that the high-ohmic resistive material layer 14 is provided on the inside surface of said neck.

In a similar manner a total of 12 cathode ray tube envelopes provided with similar resistive focusing lens structures were formed. The resistances of these focusing lenses were found to lie between 65 and 84 G$\Omega$. The focusing voltages ($V_{foc}$) of these envelopes provided with the focusing lenses ranged from 7613 V to 7704 V with a $V_{foc}$ average of 7656 V and a standard deviation of 31 V. The standard deviation of the sheet resistance of these focusing lens structures was 3.3%. In addition, the temperature coefficient of resistance (TCR) for these high-ohmic resistance layers based on lead ruthenate ranged from $-2 \cdot 10^{-6}$ $K^{-1}$ to $-165 \cdot 10^{-6}$ $K^{-1}$ with an average TCR of $97 \cdot 10^{-6}$ $K^{-1}$ and a standard deviation of $70 \cdot 10^{-6}$ $K^{-1}$.

In comparison, the standard deviation of the $V_{foc}$ of envelopes produced with focusing lens structures according to a prior art method using resistance layers based on ruthenium oxide was 300–400 V and the standard deviation of the sheet resistance was 20%. In addition, focusing lens structures according to the prior art method had an average TCR of the order of $-2500 \cdot 10^{-6}$ $K^{-1}$.

I claim:

1. A method of providing a resistive focusing lens structure for an electron beam device comprising electron-beam means for producing at least one electron beam directed to a surface, said focusing lens structure being provided on an inside surface of a glass member to be positioned around the path of said at least one electron beam, said method comprising:

forming a suspension of particles of a mixture of, by weight, of about 33%–50% of an oxidic conductive material comprising about 40%–60% of a lead ruthenate, about 25%–38% of a lead titanate and about 2%–15% of a ruthenium oxide and of about 50%–67% of a glass comprising about 30%–40% of $SiO_2$, about 3%–7.5% of $Al_2O_3$ and about 53%–67% of PbO in a suspending medium consisting essentially of a non-acidic organic liquid having a boiling point of less than 150° C., applying said suspension to said inside surface to thereby provide a coating of said particles on said inside surface, firing said coating at a temperature of 700° C.–900° C. and, before or after firing said coating, patterning said coating.

2. The method of claim 1, characterized in that the suspending medium consists essentially of at least one aliphatic alcohol of 1–5 carbons.

3. The method of claim 1, characterized in that the pH of said non-acidic organic liquid is 8–10.

4. The method of claim 1, characterized in that the weight percentage of solids in the suspension is 30%–50%.

5. The method of claim 1, characterized in that the particle size of the solids is about 1–3 μm.

* * * * *